(12) United States Patent
Huang

(10) Patent No.: US 10,895,788 B2
(45) Date of Patent: Jan. 19, 2021

(54) DISPLAY PANEL AND DISPLAY

(71) Applicants: HKC Corporation Limited, Guangdong (CN); Chongqing HKC Optoelectronics Technology Co., Ltd., Chongqing (CN)

(72) Inventor: Shishuai Huang, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 33 days.

(21) Appl. No.: 16/246,497

(22) Filed: Jan. 13, 2019

(65) Prior Publication Data
US 2020/0110295 A1    Apr. 9, 2020

Related U.S. Application Data

(63) Continuation of application No. PCT/CN2018/113304, filed on Nov. 1, 2018.

(30) Foreign Application Priority Data

Oct. 8, 2018   (CN) .................... 2018 2 1630214 U

(51) Int. Cl.
   *G02F 1/1345* (2006.01)
   *G02F 1/1339* (2006.01)
   *G02F 1/1343* (2006.01)

(52) U.S. Cl.
   CPC .......... *G02F 1/1345* (2013.01); *G02F 1/1339* (2013.01); *G02F 1/13439* (2013.01); *G02F 1/134309* (2013.01); *G02F 2202/28* (2013.01)

(58) Field of Classification Search
   CPC ........................... G02F 1/1339; G02F 1/1341
   See application file for complete search history.

(56) References Cited

U.S. PATENT DOCUMENTS

| | | | |
|---|---|---|---|
| 2009/0033843 A1* | 2/2009 | Gao | G02F 1/1345 349/106 |
| 2011/0134022 A1* | 6/2011 | Nakagawa | G02F 1/133512 345/87 |
| 2011/0134352 A1* | 6/2011 | Nakagawa | G02F 1/1339 349/43 |
| 2015/0168788 A1 | 6/2015 | Song et al. | |

FOREIGN PATENT DOCUMENTS

| | | |
|---|---|---|
| CN | 201122220 Y | 9/2008 |
| CN | 101697050 A | 4/2010 |
| CN | 103472606 A | 12/2013 |
| CN | 105158986 A | 12/2015 |
| JP | 2004309741 A | 11/2004 |

* cited by examiner

*Primary Examiner* — Alexander P Gross

(57) ABSTRACT

The present application discloses a display panel and a display, wherein a conductive particle is sandwiched between a first substrate and a second substrate of the display panel, and a non-display region on the second substrate is arranged with a plurality of metal traces; the conductive particle is accommodated in a hollow hole on the escape region formed by the metal trace, and one end of the conductive particle is disposed on an adhesive dispensing region formed by the metal trace, and the other end is abutted against the first substrate.

20 Claims, 2 Drawing Sheets

DISPLAY PANEL AND DISPLAY

CROSS REFERENCE TO RELATED APPLICATIONS

The present application is a Continuation Application of PCT Application No. PCT/CN2018/113304 filed on Nov. 1, 2018, which claims the benefit of Chinese Patent Application No. 201821630214.7 filed on Oct. 8, 2018. All the above are hereby incorporated by reference.

FIELD

The present application relates to the technical field of a display, in particular, to a display panel, and a display to which the display panel is applied.

BACKGROUND

The display panel, especially the liquid crystal display panel, is generally composed of a first substrate (a color filter substrate, which is configured to display an image) and a second substrate (thin film transistor array substrate) disposed opposite to each other, wherein a liquid crystal is disposed between the first substrate and the second substrate, and the first substrate region corresponding to the liquid crystal is a display region; a plastic frame is disposed around the liquid crystal to limit the liquid crystal, and a corresponding region of the plastic frame is a non-display area.

The plastic frame includes a conductive silver adhesive ball. When the silver adhesive ball is placed on the side of the second substrate, in order to facilitate the curing of the plastic frame and the silver adhesive ball, a part of the metal layer on the side of the second substrate requires to be designed to be hollow, and the periphery is still solid. When the process variation occurs in the silver adhesive dispensing, the position of the silver adhesive dispensing may deviate to the solid position of the metal layer, resulting in a higher position of the silver adhesive ball, so that the corresponding box thickness is thicker (that is, the interval between the first substrate and the second substrate is larger), and the light may not be incident on the color resist pixel according to an ideal route, thereby being easy to leak the light at this position.

SUMMARY

The present application provides a display panel which may solve the problem of light leakage occurring here due to the high position of the silver adhesive ball.

The present application provides a display panel comprising a first substrate, a second substrate, and a conductive particle, wherein the second substrate is disposed opposite to the first substrate, the second substrate includes a display region and a non-display region disposed on an outer circumference of the display region, and the non-display region is arranged with a plurality of metal traces; the region formed by the metal trace includes an adhesive dispensing region in a hollow structure and an escape region surrounding the adhesive dispensing region, and the conductive particle is disposed in the adhesive dispensing region and electrically connect the first substrate and the second substrate; the escape region includes a plurality of hollow holes, and the hollow hole may accommodate the conductive particle.

Optionally, the hollow hole has a rectangular shape, and the width dimension D of the hollow hole has a range of 15 um≤D≤25 um.

Optionally, the width of the metal trace is smaller than the size of the conductive particle.

Optionally, the width of the metal trace is S, and S has a range of 3 um≤S≤5um.

Optionally, the distance L from the adhesive dispensing region to the edge of one side of the escape region that faces away from the side of the adhesive dispensing region is ≥300 um.

Optionally, the distance L from the adhesive dispensing region to the edge of one side of the escape region that faces away from the side of the adhesive dispensing region is 300 um.

Optionally, a plastic frame is further disposed between the first substrate and the second substrate, and the plastic frame is disposed corresponding to the non-display region, and seals the first substrate and the second substrate; the conductive particle is disposed in the plastic frame, and a center of the plastic frame is at least 200 um from a center of the conductive particle.

Optionally, the display region is disposed with a pixel electrode, the first substrate is disposed with a common electrode with respect to the pixel electrode, and a liquid crystal layer is disposed between the pixel electrode and the common electrode.

Optionally, the metal trace includes a first metal layer disposed on a side of the second substrate facing the first substrate, a second metal layer disposed on a side of the first metal layer facing the first substrate, an insulating layer sandwiched between the first metal layer and the second metal layer, and a protective layer disposed on a side of the second metal layer facing the first substrate; the adhesive dispensing region is further disposed with a second transparent conductive layer, the second transparent conductive layer is disposed on a side of the protective layer facing away from the second metal layer and connected to the first metal layer, and the metal layer is in parallel with the second metal layer; one end of the conductive particle abuts against the transparent conductive layer, and the other end abuts against the first transparent conductive layer.

The present application further provides a display comprising the above display device.

In the technical solution of the present application, the adhesive dispensing region of the display panel has a hollow structure, so that a part of the conductive particle may be embedded in the hollow structure of the adhesive dispensing region to avoid a higher standing position of the adhesive dispensing region. In addition, when the conductive particle is dispensed to the region around the adhesive dispensing region during the dispensing process, by configuring the periphery of the adhesive dispensing region as an escape region having a hollow hole structure, and configuring the hollow hole to accommodate the conductive particle, the conductive particle tends to fall into the hollow hole of the escape region in the case where the position of the conductive particle in the escape region is deviated from the position outside the adhesive dispensing region. Therefore, the position of the conductive particle is not too high, so that the height of the conductive particle in the adhesive dispensing region the escape region is as high as possible, thereby avoiding the case that the conductive particle is locally positioned too high to allow light to enter the first substrate along a predetermined path for generating light leakage.

BRIEF DESCRIPTION OF THE DRAWINGS

In order to illustrate the technical schemes in the embodiments of the present application or in the prior art more clearly, the drawings which are required to be used in the description of the embodiments or the prior art are briefly described below. It is obvious that the drawings described below are only some embodiments of the present application. It is apparent to those of ordinary skill in the art that other drawings may be obtained based on the structures shown in accompanying drawings without inventive effort.

DESCRIPTION OF THE REFERENCE NUMERALS

Figure 1:
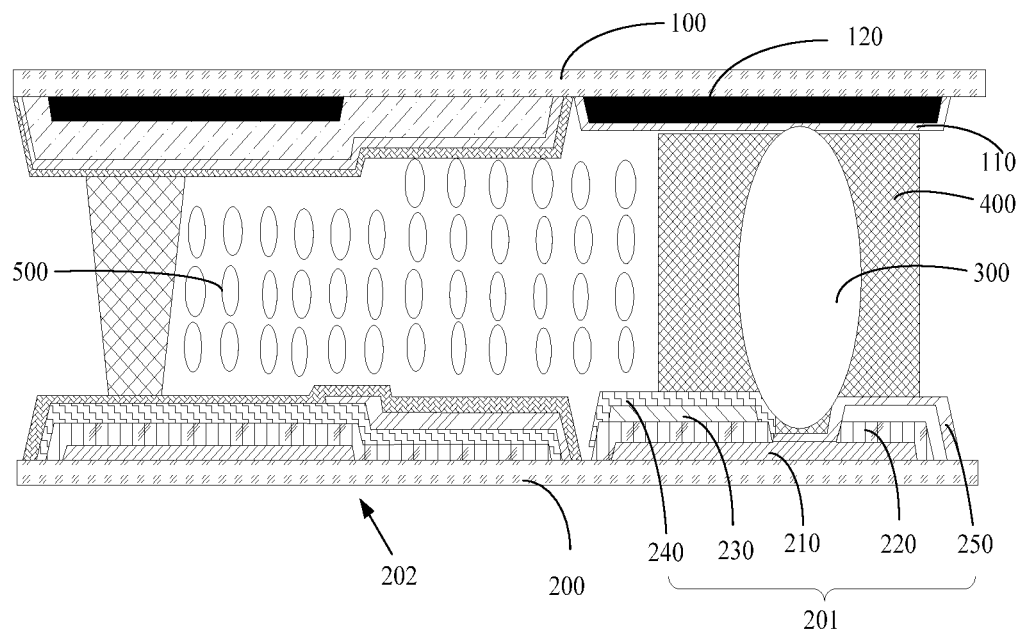
FIG. 1 is a cross-sectional view of an embodiment of a display panel of the present application.

| Reference numeral | Name | Reference numeral | Name |
|---|---|---|---|
| 100 | First substrate | 110 | First transparent conductive layer |
| 120 | Black matrix | 200 | Second substrate |
| 201 | Non-display region | 210 | First metal layer |
| 220 | Insulating layer | 230 | Second metal layer |
| 240 | Protective layer | 250 | Second transparent conductive layer |
| 2011 | Metal trace | 2012 | Adhesive dispensing region |
| 2013 | Escape region | 202 | Display region |
| 300 | Conductive particle | 400 | Plastic frame |
| 500 | Liquid crystal layer | 2013a | Hollow hole |

With reference to the drawings, the implement of the object, features and advantages of the present application will be further illustrated in conjunction with embodiments.

DETAILED DESCRIPTION OF THE EMBODIMENTS

The technical solutions in the embodiments of the present application will be clearly and completely described hereafter in connection with the embodiments of the present application. It is apparent that the described embodiments are just a part of the embodiments of the present application, but not the whole. Based on the embodiments of the present application, all the other embodiments obtained by that of ordinary skill in the art without inventive effort are within the scope of the present application.

It should be noted that if the embodiments of the present application relates to directional indications (such as up, down, left, right, front, back, . . . ), they are only used to explain the relative positional relationship, motion situation and the like between components in a certain posture (as shown in the drawings), if the specific posture changes, the directional indication shall also change accordingly.

In addition, if the embodiments of the present application relates to the descriptions of "first", "second" and the like, they are only used for the purpose of description only, and are not to be construed as indicating or implying their relative importance or implicitly indicating the number of technical features indicated. Thus, features defined with "first", "second" may include at least one such feature, either explicitly or implicitly. In addition, the technical solutions between the various embodiments may be combined with each other, provided that those skilled in the art can implement it, and when the combination of the technical solutions is contradictory or impossible to implement, it should be considered that the combination of these technical solutions does not exist, nor is it within the scope of protection required by this application.

The present application provides a display panel, in particular, to a liquid crystal display panel.

Figure 2:
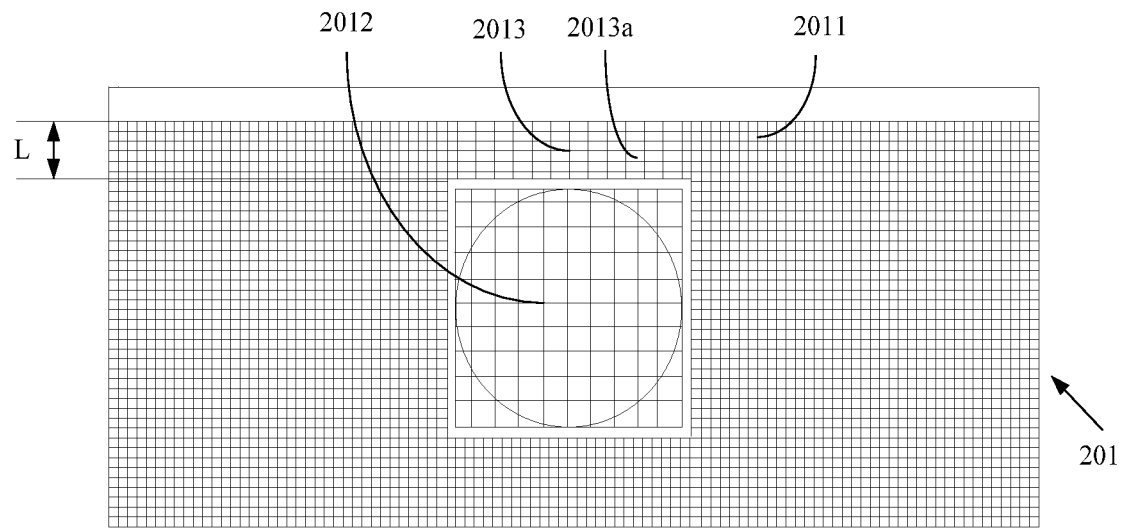
FIG. 2 is a view showing a non-display region of a second substrate in the display panel of the present application.

In an embodiment of the present application, as shown in FIGS. 1 and 2, the display panel comprises a first substrate 100, a second substrate 200, and a conductive particle 300, wherein the second substrate 200 is disposed opposite to the first substrate 100, the second substrate 200 includes a display region 202 and a non-display region 201 disposed on an outer circumference of the display region 202, and the non-display region 201 is arranged with a plurality of metal traces 2011; the region formed by the metal trace 2011 includes an adhesive dispensing region 2012 in a hollow structure and an escape region 2013 surrounding the adhesive dispensing region 2012, and the conductive particle 300 is disposed in the adhesive dispensing region 2012 and electrically connect the first substrate 100 and the second substrate 200; the escape region 2013 includes a plurality of hollow holes 2013a, and the hollow hole 2013a may accommodate the conductive particle 300.

It is understood that the first substrate may be a color filter substrate (CF substrate), and the second substrate may be a thin film transistor array substrate (TFT substrate). The second substrate 200 includes a display region 202 and a non-display region 201 disposed on an outer circumference of the display region 202; the display region 202 is provided with a pixel electrode, and the first substrate 100 is provided with a common electrode in a region corresponding to the pixel electrode. Normally, the voltage of the common electrode is input through the side of the second substrate 200, and then conducted to the first substrate 100 through the conductive particle 300, so that the first substrate 100 has a common electrode. In order not to affect the normal display effect of the display region 202, the conductive particle 300 is generally sandwiched in the non-display region 201 between the first substrate 100 and the second substrate 200. Optionally, after a metal layer accessible to a common voltage on the side of the second substrate 200 and a metal layer of the second substrate 200 is supplied with the common voltage, the metal layer transmits current to the first substrate 100 through the conductive particle 300.

Further, a certain region requires to be left on the side of the second substrate 200 for the conductive particle 300 to be fixed. The conductive particle 300 is typically dispensed between the second substrate 200 and the first substrate 100 by an adhesive dispensing process. After the adhesive dispensing is completed, the conductive particle 300 requires to be cured so that the conductive particle 300 may be stably sandwiched between the second substrate 200 and the first substrate 100. For example, the conductive particle 300 is cured by ultraviolet rays or by applying an electric field from outside the second substrate 200 through a glass substrate. Therefore, the region formed by the metal trace 2011 includes the adhesive dispensing region 2012 corresponding to the conductive particle 300. The adhesive dispensing region 2012 is subjected to a hollowing treatment so that the ultraviolet rays may illuminate the conductive particle 300 through the second substrate 200 to cause the conductive particle 300 to be combined with the plastic frame 400 and then cured by ultraviolet light.

Of course, in order to prevent the light passing through the glass substrate on the side of the first substrate 100 from being seen by the user after the light is incident on the first substrate 100, a black matrix 120 is further disposed on a side of the first substrate 100 facing the second substrate 200, and the black matrix 120 is disposed at least partially corresponding to the non-display region 201 on the TFT side. It is understood that the conductive layer electrically connected to the conductive particle 300 on the first substrate 100 may be disposed on a side of the black matrix 120 facing the second substrate 200.

Further, the region formed by the metal trace 2011 may also include a solid region. In order to avoid having a large resistance, the smaller the proportion of the hollow structure relative to the solid structure, the better. Therefore, the region formed by the metal trace 2011 also includes a solid region outside the adhesive dispensing region 2012. Due to the difference in adhesive dispensing process during the adhesive dispensing process, the adhesive dispensing position may deviate from the adhesive dispensing region 2012, and the region outside the adhesive dispensing region 2012 may still have a hollow region, or a solid region. It is understood that especially when the conductive particle is dispensed to the position of the solid region, since the solid region has no space for the conductive particle to be embedded, the position of the conductive particle falling into the solid region is higher than the standing height of the portion falling into the adhesive dispensing region 2012, therefore, the light may not be incident on the first substrate 100 according to a predetermined route, and the first substrate 100 corresponding to the higher standing portion may further leak light. Therefore, in the technical solution of the present application, the region formed by the metal trace 2011 includes an escape region 2013 disposed around the adhesive dispensing region 2012. The escape region 2013 includes a plurality of hollow holes 2013a, and the hollow holes 2013a may accommodate the conductive particle 300. In this way, the conductive particle 300 falling into the escape region 2013 may be at least partially embedded in the hollow hole 2013a, so even if the conductive particle is dispensed to the region of the escape region 2013 outside the periphery of the adhesive dispensing region 2012, the position of the conductive particle may not be too high. That is, the height of the position in the escape region 2013 and the dispensing zone 2012 may be balanced, so that the heights of the conductive particle 300 abutting against one end of the first substrate 100 are equal, and the phenomenon of light leakage is avoided.

Optionally, the conductive particle 300 is conductive substance, for example, the conductive substance may be gold or silver, etc., that is, the conductive particle 300 may be conductive gold adhesive or conductive silver adhesive or the like.

In the technical solution of the present application, the adhesive dispensing region 2012 of the display panel has a hollow structure, so that a part of the conductive particle 300 may be embedded in the hollow structure of the adhesive dispensing region 2012 to avoid a higher standing position of the adhesive dispensing region 2012. In addition, when the conductive particle 300 is dispensed to the region around the adhesive dispensing region 2012 during the dispensing process, by configuring the periphery of the adhesive dispensing region 2012 as an escape region 2013 having a hollow hole 2013a structure, and configuring the hollow hole 2013a to accommodate the conductive particle 300, the conductive particle 300 tends to fall into the hollow hole 2013a of the escape region 2013 in the case where the position of the conductive particle 300 in the escape region 2013 is deviated from the position outside the adhesive dispensing region 2012. Therefore, the position of the conductive particle 300 is not too high, so that the height of the conductive particle 300 in the adhesive dispensing region 2012 and the escape region 2013 is as high as possible, thereby avoiding the case that the conductive particle 300 is locally positioned too high to allow light to enter the first substrate 100 along a predetermined path for generating light leakage.

Referring continuously to FIGS. 1 and 2, since in the current conduction process, the signal conduction is affected by the resistance to produce different conduction effects, in order to have a better conduction effect, the resistance is as small as possible. In the technical solution of the present application, the metal trace 2011 includes a first metal layer 210 disposed on a side of the second substrate 200 facing the first substrate 100, a second metal layer 230 disposed on a side of the first metal layer 210 facing the first substrate 100, an insulating layer 220 sandwiched between the first metal layer 210 and the second metal layer 230, and a protective layer 240 disposed on a side of the second metal layer 230 facing the first substrate 100; the adhesive dispensing region 2012 is further disposed with a second transparent conductive layer 250, the second transparent conductive layer 250 is disposed on a side of the protective layer 240 facing away from the second metal layer 230 and connected to the first metal layer 210, and the metal layer 210 is in parallel with the second metal layer 230; the first transparent conductive layer 110 is disposed on a side of the first substrate 100 facing the second substrate 200, and one end of the conductive particle 300 abuts against the second transparent conductive layer 250, and the other end abuts against the first transparent conductive layer 110.

The first metal layer 210 is connected in parallel with the second metal layer 230, so that the resistance may be reduced and a better signal transmission effect may be obtained. It is understood that the insulating layer 220 is sandwiched between the first metal layer 210 and the second metal layer 230, so the bonding between the first metal layer 210 and the second metal layer 230 may be avoided. In addition, in the present embodiment, in order to prevent the second metal layer 230 from being oxidized, the protective layer 240 is further disposed on a side of the second metal layer 230 facing the first substrate 100.

In order to achieve signal conduction, the adhesive dispensing region 2012 in the region formed by the metal trace 2011 also requires to provide a second transparent conductive layer 250 on the protective layer 240, and the second transparent conductive layer 250 is connected to the first metal layer 210, so that when a voltage is input from the first metal layer 210, the voltage may be transmitted to the second transparent conductive layer 250; further, one end of the conductive particle 300 abuts the second transparent conductive layer 250, and the other end is electrically connected to the first substrate 100, thereby achieving the effect of voltage transfer to the second transparent conductive layer 250 on the side of first substrate 100, so that the first substrate 100 has a common voltage. It is understood that the first transparent conductive layer 110 is disposed on a side of the first substrate 100 facing the second substrate 200, one end of the conductive particle 300 may abut the first transparent conductive layer 110 and the other end may abut the second transparent conductive layer 250, thereby electrically communicating the first substrate 100 and the second substrate 200 through the conductive particle 300.

It is well known that the display panel is used to display an image, so the proportion of the display region 202 of the second substrate 200 is larger than that of the non-display region 201. As shown in FIG. 1, in order to realize the development effect, the display region 202 is provided with a pixel electrode, the first substrate 100 is provided with a common electrode with respect to the pixel electrode, and a liquid crystal layer 500 is sandwiched between the pixel electrode and the common electrode.

The liquid crystal layer 500 is filled with liquid crystal, and the liquid crystal has directivity. When subjected to external conditions such as an electric field, a magnetic field, a temperature, and a stress, the molecules are likely to be rearranged, so that when a light is incident through the second substrate 200, a light of different brightness is present on the first substrate 100. By utilizing the properties of the liquid crystal, in the technical solution of the present application, by adding an electric field between the second substrate 200 and the first substrate 100 to change the arrangement and the twist direction of the liquid crystal, the effect of presenting different screens may be realized.

It is understood that the second substrate 200 is provided with a thin film transistor which is a transistor having a gate, a source and a drain. When a voltage is applied to the gate, it controls the source and drain to conduct. The pixel electrode is communicated with the drain such that the pixel electrode has a current, and there is a voltage difference between the voltage on the pixel electrode and the common voltage on the side of the first substrate 100, so that the liquid crystal generates a corresponding twist phenomenon in the electric field formed by the voltage difference, thereby controlling the screen on the first substrate 100 to display different brightness.

Figure 3:
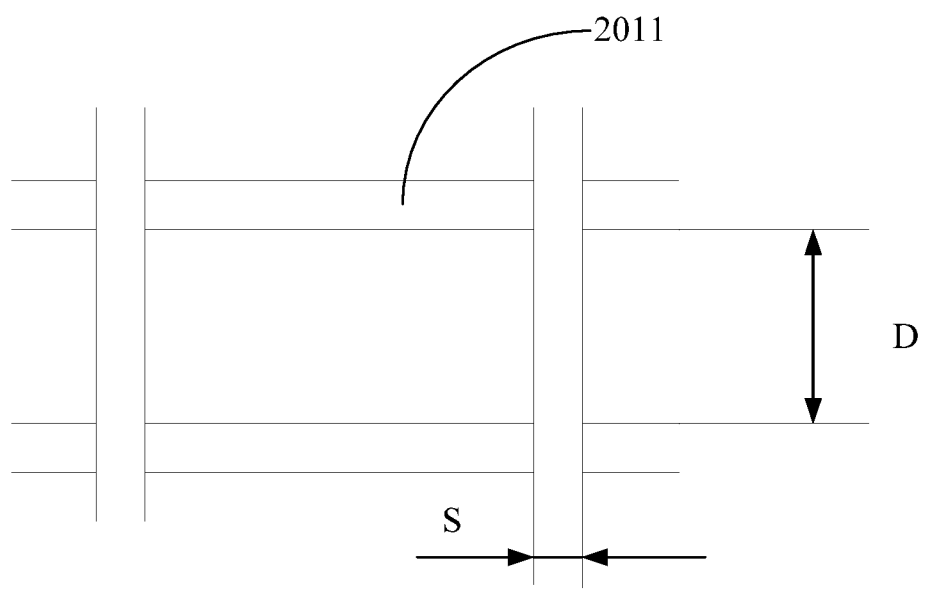
FIG. 3 is a view showing the structure of a hollow hole of a metal trace in the display panel of the present application.

As shown in FIG. 3, optionally, the shape of the hollow hole 2013a may be a rectangle, a circle or other irregular shape. The conductive particle 300, such as conductive silver paste, typically has a width or radial dimension of 5 um to 7 um. In order to enable the hollow hole 2013a to accommodate the conductive particle 300 while considering the convenience for the metal trace 2011, the hollow hole 2013a has a rectangular shape, and the width dimension D of the hollow hole 2013a ranges from 15 um≤D≤25 um.

If D<15 um, the dimension of the hollow hole 2013a may be small to completely accommodate the conductive particle 300; if D>25 um, the dimension of the hollow hole 2013a is too large, resulting in a large resistance during conduction and a poor signal transmission effect.

Further, in order to prevent dispensing the conductive particle 300 to the metal trace 2011 during the dispensing process from causing the position the conductive particle 300 bonded on the metal trace 2011 to be too high, in the present embodiment, the width dimension of the metal trace 2011 is smaller than the radial dimension of the conductive particle 300. This arrangement is such that even if the conductive particle 300 falls on the metal trace 2011, the conductive particle 300 may not be stably fixed to the metal trace 2011, but fall into the nearby hollow hole 2013a.

Optionally, the width of the metal trace 2011 is defined as S. When the width or radial dimension of the conductive particles 300 is usually 5 um to 7 um, the range of S is: 3 um≤S≤5 um.

As shown in FIG. 2, taking into account the effects of process variations in the adhesive dispensing process, the area of the escape region 2013 in the technical solution of the present application requires to be larger. In the present embodiment, the distance from the adhesive dispensing region 2012 to the side of escape region 2013 away from the edge of the adhesive dispensing region 2012 is defined as L, and the range of L is selected as: L≥300 um.

If L<300 um, the range of the escape region 2013 is small during the adhesive dispensing process, and it is highly probable that the conductive particle 300 may be dispensed to a place other than the escape region 2013. Therefore, the problem that the local standing position of the conductive particle 300 is too high during the adhesive dispensing process may not be avoided as much as possible.

Of course, the distance from the adhesive dispensing region 2012 to the side of the escape region 2013 away from the edge of the adhesive dispensing region 2012 should not be too large. The distance L from the adhesive dispensing region 2012 to the edge of the escape region 2013 in the present embodiment may be selected as 300 um, in order to achieve a better signal transmission effect in order to reduce the resistance under the premise that the standing heights of the conductive particle 300 are the same.

In the technical solution of the present application, as shown in FIG. 1, a plastic frame 400 is further disposed between the first substrate 100 and the second substrate 200. The plastic frame 400 is disposed corresponding to the non-display region 201, and seals the first substrate 100 and the second substrate 200; the conductive particle 300 is disposed in the plastic frame 400, and the center of the plastic frame 400 is at least 200 um from the center of the conductive particle 300.

In the production process, the plastic frame 400 is first applied between the second substrate 200 and the first substrate 100, and then a conductive paste having the conductive particle 300, such as conductive silver paste or conductive gold balls, is dispersed. The plastic frame 400 having the conductive particle 300 is cured by ultraviolet irradiation or by an applied voltage, thereby fixing plastic frame 400 to the non-display region 201. The plastic frame 400 is disposed in the non-display region 201 and bonded between the first substrate 100 and the second substrate 200, so that the plastic frame 400 encapsulates the second substrate 200 and the first substrate 100 for preventing external substances from entering the region enclosed by the plastic frame 400 (i.e., the display region 202) while also preventing the substances in the region enclosed by the plastic frame 400 from overflowing outside the plastic frame 400.

In addition, by disposing the conductive particle 300 in the plastic frame 400, the conductive particle 300 is combined with the glue to form a conductive colloid. For example, when the conductive particle 300 is silver, the conductive colloid is a conductive silver paste. On the one hand, when the conductive particle 300 is mixed in the plastic frame 400, the conductive colloid may be stably disposed between the second substrate 200 and the first substrate 100; on the other hand, when a common voltage is applied from the side of the second substrate 200, its signal conduction may still be conducted to the side of the first substrate 100 through the conductive particle 300 in the conductive colloid, ensuring a stable signal transmission effect.

In order to facilitate the inspection of the conductive particle 300, the center of the conductive particle 300 requires to deviate from the center of the plastic frame 400. In the present embodiment, the center of the plastic frame 400 is at least 200 μm from the center of the conductive particle 300.

The present application further provides a display, which comprises a backlight module and a display panel. The specific structure of the display panel refers to the above embodiments. Since all the technical solutions of all the above embodiments are adopted in the present display, details are not described herein again. Among them, the backlight module is disposed on a side of the second substrate 200 facing away from the first substrate 100.

Since the liquid crystal itself may not emit light, the displayed image or character is the result of modulating the light through it. In order to ensure a light source that provides light, the backlight module of the display in the present application includes a backlight source display panel, and the light is provided by the backlight source of the backlight module. The backlight module is disposed on a side of the second substrate 200 facing away from the first substrate 100, so that light emitted by the backlight source passes through the second substrate 200 and is incident on the first substrate 100 through the liquid crystal, thereby realizing the effect of the first substrate 100 to be developed.

Optionally, the backlight source includes a backlight panel, a light source, a reflective sheet, a light guide plate and a diffusion film, which are sequentially disposed. Among them, the light source may be a lamp tube or an LED light sheet. Usually, the light source is disposed on the side of the backlight panel, and the reflective sheet is configured to reflect all the light emitted by the light source to the light guide plate, and then the light emitted from the side is transferred to the front through the light guide plate, and then the light is scattered by the diffusion film. Therefore, the effect of uniformizing the intensity of light passing through the portions of the diffusion film is achieved.

The second substrate 200 further includes a lower polarizing sheet to convert the light emitted by the backlight source into a polarized light, and further, the polarized light passes through the liquid crystal molecules to rotate the polarization direction. An upper polarizing sheet is further disposed on the first substrate 100, and the light is selectively emitted by the upper polarizing plate to form a light-dark contrast, thereby displaying different shades of color combinations on the display panel.

The above mentioned is only the optional embodiment of the present application, which does not limit the patent scope of the present disclosure, and any equivalent structure transformation made by using the specification and the drawings of the present disclosure or direct/indirect applications in other related technical fields should be contained in the scope of patent protection in a similar way.

What is claimed is:

1. A display panel, wherein the display panel comprises:
   a first substrate;
   a second substrate disposed opposite to the first substrate, the second substrate including a display region and a non-display region disposed on an outer circumference of the display region, the non-display region being arranged with a plurality of metal traces;
   a conductive particle sandwiched between the first substrate and the second substrate;
   wherein the region formed by the plurality of metal traces includes an adhesive dispensing region in a hollow structure and an escape region surrounding the adhesive dispensing region, and the conductive particle is disposed in the adhesive dispensing region and electrically connects the first substrate and the second substrate; the escape region includes a plurality of hollow holes, and at least one of the plurality of hollow holes is configured to accommodate the conductive particle falling into the escape region when the conductive particle is dispensed to the escape region due to a difference in an adhesive dispensing process, wherein a width of the at least one of the plurality of hollow holes is larger than a width or a diameter of the conductive particle.

2. The display panel according to claim 1, wherein the at least one of the plurality of metal traces includes a first metal layer disposed on a side of the second substrate facing the first substrate, a second metal layer disposed on a side of the first metal layer facing the first substrate, an insulating layer sandwiched between the first metal layer and the second metal layer, and a protective layer disposed on a side of the second metal layer facing the first substrate; the adhesive dispensing region is further disposed with a second transparent conductive layer, the second transparent conductive layer is disposed on a side of the protective layer facing away from the second metal layer and connected to the first metal layer, and the first metal layer is in parallel with the second metal layer; a first transparent conductive layer is disposed on a side of the first substrate facing the second substrate, and one end of the conductive particle abuts against the second transparent conductive layer, and the other end abuts against the first transparent conductive layer.

3. The display panel according to claim 2, wherein the distance L from the adhesive dispensing region to the edge of one side of the escape region that faces away from the side of the adhesive dispensing region is ≥300 um.

4. The display panel according to claim 2, wherein the distance L from the adhesive dispensing region to the edge of one side of the escape region that faces away from the side of the adhesive dispensing region is 300 um.

5. The display panel according to claim 2, wherein a plastic frame is further disposed between the first substrate and the second substrate, and the plastic frame is disposed corresponding to the non-display region, and seals the first substrate and the second substrate; the conductive particle is disposed in the plastic frame, and a center of the plastic frame is at least 200 um from a center of the conductive particle.

6. The display panel according to claim 2, wherein the display region is disposed with a pixel electrode, the first substrate is disposed with a common electrode with respect to the pixel electrode, and a liquid crystal layer is disposed between the pixel electrode and the common electrode.

7. The display panel according to claim 2, wherein the at least one of the plurality of hollow holes has a rectangular shape, and a width dimension D of the at least one of the plurality of hollow holes has a range of 15 um≤D≤25 um.

8. The display panel according to claim 7, wherein the distance L from the adhesive dispensing region to the edge of one side of the escape region that faces away from the side of the adhesive dispensing region is ≥300 um.

9. The display panel according to claim 2, wherein a width of the at least one of the plurality of metal traces is smaller than the size of the conductive particle.

10. The display panel according to claim 9, wherein the distance L from the adhesive dispensing region to the edge of one side of the escape region that faces away from the side of the adhesive dispensing region is ≥300 um.

11. The display panel according to claim 9, wherein the width of the at least one of the plurality of metal traces is S, and S has a range of 3 um≤S≤5 um.

12. The display panel according to claim 11, wherein the distance L from the adhesive dispensing region to the edge of one side of the escape region that faces away from the side of the adhesive dispensing region is ≥300 um.

13. A display panel, wherein the display panel comprises:
    a first substrate;

a second substrate disposed opposite to the first substrate, the second substrate including a display region and a non-display region disposed on an outer circumference of the display region, the non-display region being arranged with a plurality of metal traces;

a conductive particle sandwiched between the first substrate and the second substrate;

wherein the region formed by the plurality of metal traces includes an adhesive dispensing region in a hollow structure and an escape region surrounding the adhesive dispensing region, and the conductive particle is disposed in the adhesive dispensing region and electrically connects the first substrate and the second substrate; the escape region includes a plurality of hollow holes, and at least one of the plurality of hollow holes is configured to accommodate the conductive particle falling into the escape region when the conductive particle is dispensed to the escape region due to a difference in an adhesive dispensing process, wherein a width of the at least one of the plurality of hollow holes is larger than a width or a diameter of the conductive particle;

the at least one of the plurality of hollow holes has a rectangular shape, and a width dimension D of the at least one of the plurality of hollow holes has a range of 15 um≤D≤25 um;

a width of the at least one of the plurality of metal traces is smaller than the size of the conductive particle.

14. A display, wherein the display comprises a display panel, the display panel including: a first substrate;

a second substrate disposed opposite to the first substrate, the second substrate including a display region and a non-display region disposed on an outer circumference of the display region, the non-display region being arranged with a plurality of metal traces;

a conductive particle sandwiched between the first substrate and the second substrate;

wherein the region formed by the plurality of metal traces includes an adhesive dispensing region in a hollow structure and an escape region surrounding the adhesive dispensing region, and the conductive particle is disposed in the adhesive dispensing region and electrically connects the first substrate and the second substrate; the escape region includes a plurality of hollow holes, and at least one of the plurality of hollow holes is configured to accommodate the conductive particle falling into the escape region when the conductive particle is dispensed to the escape region due to a difference in an adhesive dispensing process, wherein a width of the at least one of the plurality of hollow holes is larger than a width or a diameter of the conductive particle.

15. The display according to claim 14, wherein the at least one of the plurality of metal traces includes a first metal layer disposed on a side of the second substrate facing the first substrate, a second metal layer disposed on a side of the first metal layer facing the first substrate, an insulating layer sandwiched between the first metal layer and the second metal layer, and a protective layer disposed on a side of the second metal layer facing the first substrate; the adhesive dispensing region is further disposed with a second transparent conductive layer, the second transparent conductive layer is disposed on a side of the protective layer facing away from the second metal layer and connected to the first metal layer, and the first metal layer is in parallel with the second metal layer; a first transparent conductive layer is disposed on a side of the first substrate facing the second substrate, and one end of the conductive particle abuts against the second transparent conductive layer, and the other end abuts against the first transparent conductive layer.

16. The display according to claim 14, wherein the at least one of the plurality of hollow holes has a rectangular shape, and a width dimension D of the at least one of the plurality of hollow holes has a range of 15 um≤D≤25 um.

17. The display according to claim 14, wherein the distance L from the adhesive dispensing region to the edge of one side of the escape region that faces away from the side of the adhesive dispensing region is ≥300 um.

18. The display according to claim 14, wherein a plastic frame is further disposed between the first substrate and the second substrate, and the plastic frame is disposed corresponding to the non-display region, and seals the first substrate and the second substrate; the conductive particle is disposed in the plastic frame, and a center of the plastic frame is at least 200 um from a center of the conductive particle.

19. The display according to claim 14, wherein a width of the at least one of the plurality of metal traces is smaller than the size of the conductive particle.

20. The display according to claim 19, wherein a width of the at least one of the plurality of metal traces is S, and S has a range of 3 um≤S≤5 um.

* * * * *